United States Patent

[11] 3,586,834

[72] Inventors David E. Dykaar
Great Neck;
Bernard J. Stein, Jamaica Estates, both of, N.Y.

[21] Appl. No. 868,004
[22] Filed Oct. 21, 1969
[45] Patented June 22, 1971

[73] Assignee Lundy Electronics & Systems Inc.
Glen Head, N.Y.

[54] EMBOSSED CORRECTION SLIP BEARING DOCUMENT, AND APPARATUS AND METHOD FOR ADAPTING A DOCUMENT AND ATTACHED CORRECTION SLIP FOR DOCUMENT HANDLING WITH A PLURALITY OF OTHER DOCUMENTS

19 Claims, 5 Drawing Figs.

[52] U.S. Cl. .......... 235/61.12, 101/3, 161/116
[51] Int. Cl. .......... G06k 19/04
[50] Field of Search .......... 101/3, 32; 84/166; 214/10.5, 9; 161/116, 118—121, 123; 52/560, 558, 518, 553; 40/158; 235/61.12, 61.112

[56] References Cited

UNITED STATES PATENTS

| | | | |
|---|---|---|---|
| 1,765,951 | 6/1930 | Sullivan | 101/3 |
| 1,989,319 | 1/1935 | Kömmling | 101/3 |
| 2,431,017 | 11/1947 | Ayres | 235/61.12 |
| 2,848,163 | 8/1958 | Serrell | 235/61.12 |

*Primary Examiner*—Thomas A. Robinson
*Attorney*—Brumbaugh, Graves, Donohue and Raymond

ABSTRACT: A system for adapting an indicia bearing document having an indicia bearing correction slip secured thereto for document handling in stacked relation with other documents, the thickness of the document being increased at a particular zone due to the attachment of the correction slip. The document is guided to an embosser, which embosses a portion of the document at a location spaced from the increased thickness zone so as to increase the thickness of the document at the embossed location by substantially the same amount as the document thickness is increased at the increased thickness zone.

PATENTED JUN 22 1971 3,586,834

INVENTORS.
DAVID E. DYKAAR &
BERNARD J. STEIN
BY
Brumbaugh, Graves, Donohue & Raymond
their ATTORNEYS

EMBOSSED CORRECTION SLIP BEARING DOCUMENT, AND APPARATUS AND METHOD FOR ADAPTING A DOCUMENT AND ATTACHED CORRECTION SLIP FOR DOCUMENT HANDLING WITH A PLURALITY OF OTHER DOCUMENTS

This invention relates to a correction slip bearing document and to a system for adapting a document having a correction slip attached thereto for document handling operations and, more particularly, to novel and improved method and apparatus for adapting an indicia bearing document having an indicia bearing correction slip secured thereto for document handling operations in stacked relation with other documents, and to a novel form of embossed correction slip bearing document.

Machines are now widely used in the banking industry for reading indicia carried by checks relating to routing symbol, transit number, account number, amount and the like, and machines are also available which sort the checks in accordance with one or more of such indicia. An example of such reader-sorter apparatus is disclosed in our U.S. Pat. No. 3,363,756, which issued Jan. 16, 1968. The characters are printed on checks used in the United States with magnetic ink, and such magnetic ink characters, sometimes called MICR (magnetic ink characters recognition) characters, are printed and located on the check in accordance with the detailed specifications which may be found in Bank Management Publication 147 R2, published by the Bank Management Committee of the American Bankers Association, 90 Park Avenue, New York, New York.

Such reader-sorter apparatus also has application in the banking industry for deposit tickets, as well as in commerce for billing slips and the like. Furthermore, our above-identified reader-sorter apparatus may be readily adapted to sort documents bearing magnetic ink characters of other shapes, such as the bar code system of the CMC-7 type font. In addition, indicia bearing documents may also be read by scanning the indicia optically.

Regardless of the systems used for handling indicia bearing documents by machine, it sometimes occurs that incorrect characters are printed on a document, or one or more characters may be improperly or illegibly printed. As a result, such documents must be removed from the normal machine system and handled manually. Alternatively, a correction slip bearing the correct indicia may be attached to the document, so that the correction slip carrying document may be handled by machine techniques. The attachment of the correction slip to the document creates a zone of increased thickness adjacent one longitudinal edge of the document. When such correction slip bearing documents are stacked, the stack becomes considerably higher at the edge adjacent the increased thickness zone as compared to the opposite edge, making it difficult or impossible to feed such an uneven stack of documents to a document handling machine.

This difficulty is overcome in the present invention for adapting a correction slip bearing document for document handling in stacked relation with other documents by embossing a portion of the document at a location spaced from the increased thickness zone so as to increase the thickness of the document at the embossed location by substantially the same amount as the document thickness is increased at the increased thickness zone. Accordingly, the embossed correction slip carrying document may be stacked with other embossed correction slip documents and/or with documents not carrying a correction slip to provide an even stack of documents which may be readily handled by a conventional document handling machine.

For a more complete understanding of the invention, reference may be had to the following detailed description of exemplary embodiments taken in conjunction with the accompanying figures of the drawings, in which.

Figures 1, 2, 3, 4, 5:
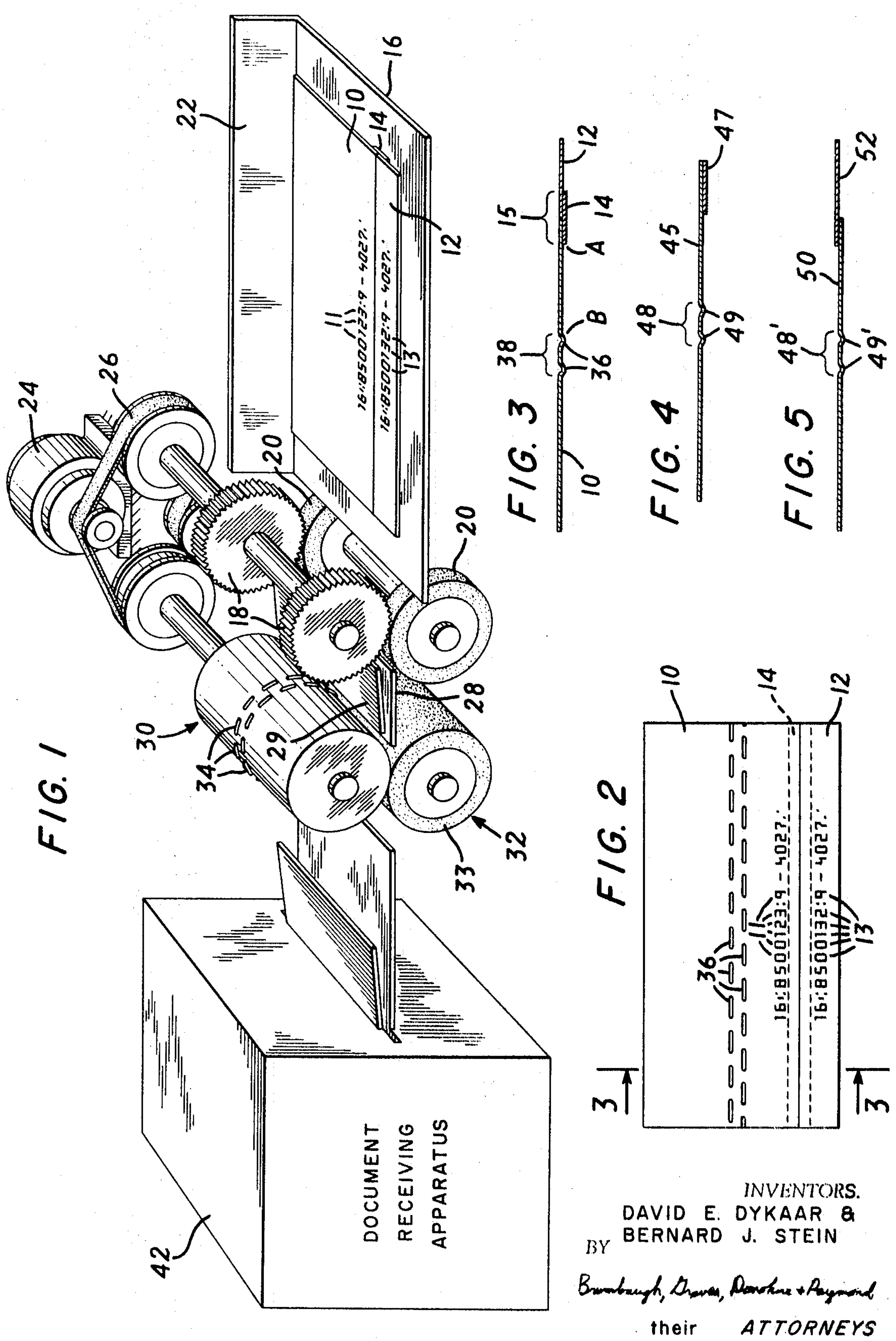
FIG. 1 is a simplified perspective view of mechanical apparatus for embossing a correction slip bearing document in accordance with the present invention, the apparatus for receiving embossed documents being illustrated in schematic form.
FIG. 2 is a plan view of the correction slip bearing document after it has been embossed by the apparatus of FIG. 1.
FIG. 3 is sectional view taken along the line 3–3 of FIG. 2 and looking in the direction of the arrows.
FIG. 4 is a sectional view of an embossed correction slip bearing document according to another embodiment of the invention.
FIG. 5 is a sectional view of an embossed correction slip bearing document according to still another embodiment of the invention.

Referring now to FIG. 1, a document 10 bears a plurality of magnetic ink characters 11, for example, some of which are incorrect or are illegibly printed. Accordingly, a correction slip 12 bearing the correct magnetic ink characters 13 is secured along one longitudinal edge of the document 10 by means of an adhesive tape 14, which is affixed to the back side of the document and the correction slip at adjacent lateral edges thereof. The adhesive tape 14 is preferably transparent to expose any writing that may be on the back of the document 10 beneath the adhesive tape. The document 10 and the correction slip 12 are in substantially the same plane (see FIG. 3) so that the attachment of the correction slip to the document increases the thickness of the correction slip carrying document by the thickness of the adhesive strip 14, the adhesive strip comprising a zone 15 at which the thickness of the correction slip carrying document has been increased by the amount A, as shown in FIG. 3. Inasmuch as the increased thickness zone 15 is adjacent one longitudinal edge of the document 10, it is apparent that a stack of unembossed documents (such as illustrated in FIG. 1) would be considerably higher at the edge adjacent the increased thickness zone as compared with the opposite longitudinal edge, making it difficult or impossible to feed such an uneven stack of documents to a document handling machine.

The correction slip bearing document 10 may be guided along a platform 16 manually by the operator to a pair of feed rollers 18 against which a pair of idler rollers 20 are spring biased. Alternatively, the document 10 may be conveyed to the feed rollers 18 and idler rollers 20 by any suitable mechanical drive (not shown). The platform 16 is disposed so as to insure that the document 10 is guided to the bite between the feed rollers 18 and the idler rollers 20. A registration plate 22 is disposed perpendicular to the platform 16 and parallel to the desired direction of travel of the document 10 to the feed rollers 18 and 20 and to the embossing elements downstream thereof to be described presently. Furthermore, the registration plate 22 is so disposed with respect to the embossing elements that when the longitudinal edge of the document 10 remote from the correction slip 12 abuts the registration plate, the embossing elements will emboss the document at a desired predetermined location.

The feed rollers 18 are driven by a conventional motor 24 through a belt drive 26 so as to drive the correction slip bearing document 10 engaged thereby between a pair of guides 28 and 29 to a steel embossing roller 30, also driven by the motor 24 through the belt drive 26, and an idler roller 32 having a resilient document engaging surface 33 composed of rubber, for example, the idler roller being spring biased against embossing roller 30. The feed rollers 18 and 20 firmly grip the document 10 while it is engaged by the embossing roller 30 and the idler roller 32 so as to prevent the document from being twisted by the embossing elements.

The embossing roller 30 is formed with a plurality of embossing protrusions 34 projecting therefrom, and the idler roller 32 yieldably receives the embossing protrusions 34. The elastomeric surface 33 of the idler roller 32 has a suitable durometer rating so as to insure that a permanent embossment is formed on the various thicknesses and types of document material to be embossed. Thus, the embossing action between the embossing protrusions 34 and the embossing protrusion receiving roller 32 exceeds the yield point of the document 10, thus leaving a permanent impression therein and preventing the spring-back of the document to its original condition. In addition, the embossing protrusions 34 extend from the embossing roller 30 by an amount such that the embossed portions 36 of the document 10 (see FIG. 3) increase the thickness of the document at the embossed zone 38 by the amount indicated as B in FIG. 3, this increased thickness B being substantially the same as the increased thickness A caused at the zone 15 by the attachment of the correction slip 12 to the document 10.

The thickness of the documents 10 may be predominantly 0.0045 inch, varying over a range of 0.003—0.0065 inch, for example, the transparent adhesive tape 14 may have a thickness of 0.0015 inch, and the correction slip may have a thickness of 0.0045 inch. In this circumstance the embossments 36 would be made to project 0.0015 inch.

In the preferred embodiment the embossing protrusions 34 are disposed in two substantially mutually parallel rows which are substantially parallel to the path of travel of the document 10 between the embossing roller 30 and the idler roller 32. This arrangement produces an embossed correction slip carrying document having two substantially mutually parallel rows of embossments 36 at the embossed zone 38 which are spaced from the increased thickness zone 15 and which are substantially parallel to the longitudinal edges of the document 10. As discussed above, the amount by which the embossing protrusions 34 projects from the embossing roller 30 and the durometer rating of the elastomeric layer 33 of the idler roller 32 are such that permanent embossments 36 are formed in the document which project therefrom by an amount B which is substantially the same as the amount A by which the document thickness is increased as a result of the attachment of the correction slip 12 to the document 10.

It is to be understood that the embossing roller 30 may be formed with other arrays of embossing protrusions 34. Thus, the protrusions may be arranged in one, three or more rows, and the rows of protrusions need not be mutually parallel or parallel to the longitudinal sides of the document. In addition, the embossing protrusions may be randomly disposed on the surface of the embossing roller, and the individual protrusions may be of two or more sizes. In the preferred form of the invention, however, the circumference of the embossing roller 30 and the circumferential location of the embossing protrusions is so related to the length of the documents being embossed that successive documents when spaced at substantially regular intervals are embossed at different locations in order to prevent adjacent documents from interlocking when the embossed documents are stacked.

The embossing roller 30 and the idler roller 32 cooperate to drive a correction slip bearing document being embossed thereby to a suitable document receiving apparatus indicated schematically at 42. Such document receiving apparatus could comprise one of the document receiving pockets disclosed in our U.S. Pat. No. 3,363,756, which issued Jan. 16, 1968, for example. Alternatively, the embossed documents could be fed directly to suitable conventional document handling apparatus for reading, sorting or other purposes.

FIG. 4 illustrates a different type of correction slip carrying document which has also been embossed by the apparatus of FIG. 1. Here the document 45 carries a correction slip 47 which is affixed directly over the incorrect indicia on the document, so that the thickness of the correction slip is the amount by which the thickness of the correction slip carrying document is increased due to the attachment of the correction slip. As before, an embossed zone 48 comprises two substantially mutually parallel rows of embossments 49, which project from the same side of the document as that on which the correction slip is affixed. It may be noted, however, that the embossments 49 project from the front face of the document 45, i.e., the indicia bearing face, whereas the embossments 36 project from the back of the document 10.

FIG. 5 illustrates another type of correction slip carrying document which has been embossed by the apparatus of FIG. 1. Here, the document 50 has affixed thereto a correction slip 52 which extends laterally beyond one longitudinal edge of the document, so that when the correction slip carrying document is driven into cooperative relation with the reading head of a document reader, the correct indicia on the correction slip 52 will be directly beneath the reading head, while the incorrect indicia on the document 50 will be displaced laterally therefrom. It will be observed that the embossments 49' of the embossed zone 48' project from the back of the document 50, and so extend from the opposite side of the document as does the increased thickness zone caused by the attachment of the correction slip 52 to the document 50. Even so, the embossments 49' project from the document by substantially the same amount as the thickness of the correction slip bearing document is increased by the correction slip 52. Accordingly, the embossed correction slip carrying document illustrated in FIG. 5 may also be stacked with other such correction slip bearing documents and/or with documents having no correction slip in an even stack which may be readily handled by conventional document handling apparatus.

It is to be understood that the embossments can be made to project from the opposite sides of the documents illustrated in FIGS. 4 and 5 merely by inverting the documents before they are fed through the embossing apparatus of FIG. 1.

It will be understood by those skilled in the art that the above-described exemplary embodiments are susceptible of variation and modification without departing from the spirit and scope of the invention. For example, the correction slip carrying documents may be fed to the embosser intermittently, the embossing element being reciprocated to emboss each document while it is momentarily stopped thereunder. Alternatively, the feed rollers 18 and 20 may be omitted and the correction slip carrying documents fed manually directly to the embossing roller 30 and the idler roller 32. Furthermore, the embossing roller 30, and the idler roller 32 engaged thereby, could be manually rotated by a crank connected to the embossing roller, for example. Also, a stack of correction slip carrying documents may be automatically fed to the embosser by modifying the single document feeder disclosed in our above-mentioned U.S. Pat. No. 3,363,756 so that the elevating table upon which the stack of documents is placed is pivotally mounted so as to rotate about an axis offset from the table, the table being urged upwardly against extractor rollers by one or more springs, for example. The documents would be placed on the table so that the longitudinal edge adjacent the increased thickness zone is remote from the offset axis, and the stack containing table is located at such a distance from the offset axis that each document lies substantially in a plane containing that axis. Thus, the top document of the stack always lies against the extractor rollers in the same plane regardless of the number of documents in the stack.

We claim:

1. A method for adapting an indicia bearing document having an indicia bearing correction slip secured thereto for document handling operations wherein the document and attached correction slip are stacked with other documents, the securing of the correction slip to an edge of the document resulting in a localized increase in thickness of the correction slip bearing document by a predetermined amount in a predetermined zone, comprising the steps of guiding the correction slip carrying document to embossing apparatus, and embossing at least one portion of the document at a location spaced from the increased thickness zone so as to increase the thickness of the document at the embossed location by substantially the same amount as the thickness is increased at the increased thickness zone.

2. The method as claimed in claim 1, wherein a plurality of correction slip carrying documents are successively guided to the embossing apparatus, and the embossing step comprises embossing successive documents at different locations in order to prevent adjacent documents from interlocking when the embossed documents are stacked.

3. The method as claimed in claim 1, wherein the correction slip is secured to the document substantially along one edge thereof and the document is embossed across a transverse extent of the document in substantially parallel but spaced-apart relation to the edge to which the document is secured.

4. Apparatus for adapting an indicia bearing document having an indicia bearing correction slip secured thereto for document handling operations wherein the document and attached correction slip are stacked with other documents, the securing of the correction slip to an edge of the document resulting in a localized increase in thickness of the correction slip bearing document by a predetermined amount in a predetermined zone, comprising means for embossing at least one portion of the correction slip bearing document at a location spaced from the increased thickness zone so as to increase the thickness of the document at the embossed location by substantially the same amount as the thickness is increased at the increased thickness zone, and means for guiding the document to said embossing means.

5. Apparatus as claimed in claim 4, wherein said embossing means includes a first member and a second member in cooperative relation with said first member, said first and second members having document-engaging surfaces, said first member having at least one embossing protrusion projecting from its document-engaging surface, said second member being adapted to receive said embossing protrusion of said first member, and wherein said guiding means guides the document between said first and second members.

6. Apparatus as claimed in claim 5, wherein said guiding means includes registration plate means disposed with respect to said embossing means so that when a predetermined edge of the document abuts said registration plate means said embossing means will emboss the document at a predetermined location spaced from the increased thickness zone.

7. Apparatus as claimed in claim 5, wherein said second member has an elastomeric surface adapted to yieldably receive said embossing protrusion of said first member, said elastomeric surface having a durometer rating such that a permanent embossment is formed at the embossed location of the document when the document is engaged by said first and second members.

8. Apparatus as claimed in claim 7, wherein said first member includes a first roller having said embossing protrusion projecting therefrom and said second member includes a second roller having said elastomeric surface, and including means for rotating said first and second rollers in directions to drive therebetween a document guided thereto by said guiding means.

9. Apparatus as claimed in claim 8, wherein the circumference of said first roller is so related to the length of documents being guided to said embossing means that successive documents are embossed at different locations in order to prevent adjacent documents from interlocking when the embossed documents are stacked.

10. Apparatus as claimed in claim 9, wherein said first roller has a plurality of embossing protrusions projecting therefrom and the circumferential location of said embossing protrusions is so related to the length of documents being guided to said embossing means that successive documents when spaced at substantially regular intervals are embossed at different locations along their length in order to prevent adjacent documents from interlocking when the embossed documents are stacked.

11. Apparatus as claimed in claim 8, wherein said first roller has a plurality of embossing protrusions disposed in at least two substantially mutually parallel rows which are substantially parallel to the path of travel of a document driven between said first and second rollers.

12. Apparatus as claimed in claim 8, wherein said guiding means includes registration plate means disposed substantially parallel to the path of travel of a document driven between said first and second rollers and substantially perpendicular to the plane in which the document travels between said first and second rollers, said registration plate means being so disposed with respect to said first roller that when a predetermined edge of the document abuts said registration plate means said embossing protrusion projecting from said first roller will emboss the document at a predetermined location spaced from the increased thickness zone.

13. Apparatus as claimed in claim 8, including means for feeding the document between said first and second rollers.

14. Apparatus as claimed in claim 13, wherein said feeding means includes at least one first feed roller having a document-engaging surface and at least one second feed roller having a document-engaging surface, the document-engaging surface of said first feed roller adapted to engage the document-engaging surface of said second feed roller, said first and second feed rollers being so spaced from said first and second embossing rollers that said first and second feed rollers grip and control the position of a document being fed thereby while the document is passing in cooperative relation with said first and second embossing rollers, and means for rotating said first and second feed rollers.

15. Apparatus according to claim 4, wherein the correction slip is secured to the document so that the increased thickness zone extends by the predetermined amount from one side of the document, and said embossing means forms an embossment which extends from said one side of the document by substantially the said predetermined amount.

16. An indicia bearing document having an indicia bearing correction slip secured thereto, the attachment of the correction slip to the document increasing the thickness of the correction slip carrying document by a predetermined amount at a predetermined zone of the document, and at least one embossed portion of the document at a location spaced from the increased thickness zone, the embossed portion increasing the thickness of the document at the embossed location by substantially the same amount as the thickness is increased at the increased thickness zone, whereby a plurality of such correction slip carrying documents may be stacked so that the documents in the stack are substantially parallel to each other.

17. The correction slip carrying document according to claim 16, wherein the correction slip is secured to the document by an adhesive strip which is affixed to the document and to the correction slip at the increased thickness zone, the document and the correction slip being in substantially the same plane, whereby the thickness of the adhesive strip is the amount by which the thickness of the correction slip carrying document is increased at the increased thickness zone.

18. The correction slip carrying document according to claim 16, wherein the indicia bearing correction slip is affixed over at least some of the indicia on the document at the increased thickness zone, whereby the thickness of the correction slip is the amount by which the thickness of the correction slip carrying document is increased at the increased thickness zone.

19. The correction slip carrying document according to claim 16, wherein the attachment of the correction slip to the document causes an increased thickness zone which extends by the predetermined amount from one side of the document, and the embossed portion extends from said one side of the document by substantially the said predetermined amount.